E. H. COOPER.
CLUTCH.
APPLICATION FILED JULY 13, 1916.
1,217,569.
Patented Feb. 27, 1917.
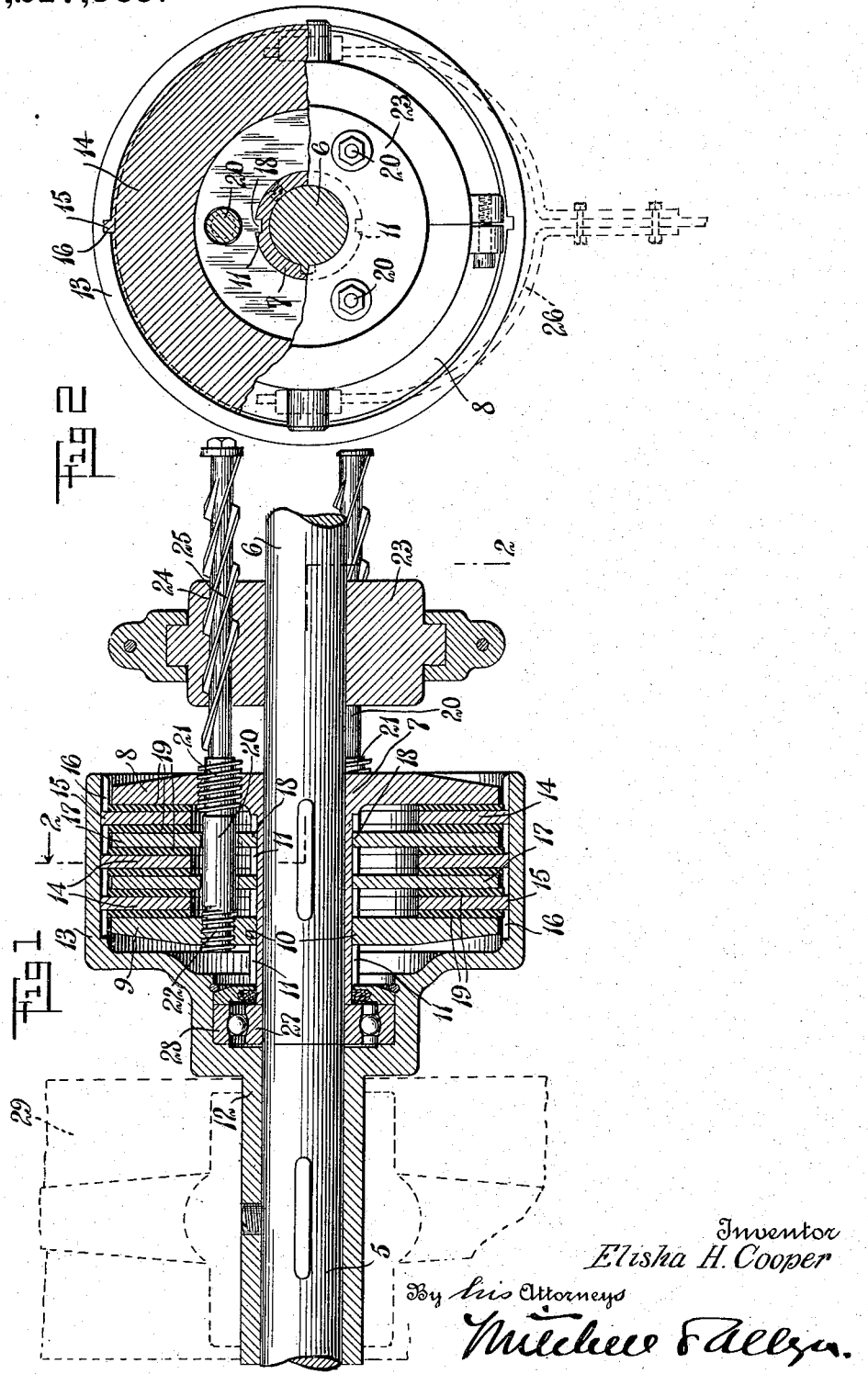
Inventor
Elisha H. Cooper
By his Attorneys

UNITED STATES PATENT OFFICE.

ELISHA H. COOPER, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

CLUTCH.

1,217,569.  Specification of Letters Patent.  Patented Feb. 27, 1917.

Application filed July 13, 1916. Serial No. 109,045.

*To all whom it may concern:*

Be it known that I, ELISHA H. COOPER, a citizen of the United States of America, residing at New Britain, Connecticut, have invented a new and useful Clutch, of which the following is a specification.

This invention relates to clutches of the frictional type and the objects of the invention are to secure a powerful clutching effect with the exertion of but slight energy, to accurately control the clutching action so as to make the clutching action as gradual or as sudden as need be and further to simplify and reduce the number of parts necessary and to provide as a whole a clutch of rugged, practical construction capable of withstanding any hard usage to which it may be subjected.

The foregoing and other objects I have accomplished by employing means in the form of differential screws for bringing the two clutch members into coöperating engagement. In the present disclosure one member of the clutch carries a frictional portion disposed between two clamping elements of the other member of the clutch and these clamping elements are brought together into clamping relation by studs having differential screw threaded portions engaged with the respective clamping elements. The differential action of these screw studs brings the clamping elements together with a very powerful but at the same time gradual movement.

Another feature of the invention is the provision of the screw studs with exposed shank portions having relatively coarse screw threads in the nature of cams which engage in corresponding cam sockets in a shiftable sleeve so that by the movement of this single shiftable sleeve all the clamping screws will be simultaneously rotated.

Various other features and details of construction will appear as the specification proceeds, attention being directed to the accompanying drawing forming a part hereof and wherein I have illustrated the invention embodied in a practical form.

In said drawing:

Figure 1 is a longitudinal sectional view of a multiple disk form of clutch constructed in accordance with and embodying the invention.

Fig. 2 is a transverse sectional view of the same taken substantially on the plane of the line 2—2 of Fig. 1.

In the present illustration the clutch is shown in its application as a shaft coupling for clutching together the ends of two shaft sections 5 and 6.

7 designates one of the clutch members the same being here shown in the form of a sleeve keyed on the shaft section 6 and carrying an upstanding clamping flange 8, in opposition to which there is provided a coöperating clamping plate or flange 9 slidably keyed on the sleeve portion of the clutch member by keying lugs 10 working in key slots 11 cut in the sleeve.

The companion clutch member is designated 12, the same taking the form in the present disclosure of a sleeve keyed or otherwise secured on the shaft section 5 and having a barrel portion 13 inclosing the first clutch member, carrying frictional means such as a disk or disks 14 disposed between the clamping elements of the first clutch member, a plurality of said disks being shown slidably keyed within the barrel by being provided with key lugs 15 working in the key slots 16 in the barrel. Also in the present disclosure the first clutch member is shown provided with a plurality of friction disks 17 interposed in alternating relation between the friction disks of the second or outer clutch member and slidably keyed to the first clutch member by key lugs 18 working in the key slots 11. Friction washers 19 are shown interposed between the meeting faces of the two sets of friction disks or rings.

The clutching and unclutching action is obtained in my invention by means of differential screw studs 20, said studs acting in the present disclosure to shift the clamping elements of the first clutch member into and out of clutching engagement with the coöperating parts of the second clutch member and having for the purpose differentially screw threaded portions 21 and 22 engaging the clamping flanges 8 and 9 respectively.

Means are provided for simultaneously rotating the clamping screws, where there is more than one screw employed, as in the illustration, where three are shown, the means disclosed herein being also of novel construction and consisting of a sleeve 23 slidably engaged on the shaft section 6 and having screw sockets 24 receiving the outer screw threaded shank portions 25 of the clamping screws. These screw threads on the shank portions are of relatively coarse pitch and in the nature of long spirals or cams so as to produce an easy turning of the clamping screws as the controlling collar is shifted.

The controlling collar may be shifted by various means, a shifting yoke 26 of ordinary construction being shown for this purpose in the present illustration.

From the foregoing it will be apparent that when the controlling collar is shifted in the right direction the clamping screws will be rotated and will by reason of the differential screw threads bring the clamping elements of the one clutch member together upon the coöperating elements of the other clutch member with a relatively slow but powerful clamping action and without any undue strain on the threads.

A special advantage of this construction is that the screw threads can be made relatively coarse and heavy and so strong enough to withstand any strain to which they may be subjected, the differential action compensating for the increased speed of action due to the increased size of thread and so overcoming the tendency to produce a too rapid movement of the clutch members. It will be evident that by the proper designing and proportioning of the differential screw threads, the requisite clutching movement to meet different requirements may be obtained with certainty and exactness.

Another advantage possessed by this invention is that the clutching elements are positively shifted in both directions so that both actions of clutching and unclutching are positive.

In the case of the shaft coupling illustrated the two shaft ends are maintained in alinement by means of a ball bearing having the inner race ring 27 engaged on the end of the shaft section 6 and the outer race ring 28 carried by the clutch member 12 on the other shaft section.

The invention is adapted to many uses, clutch pulleys for instance, in which case the pulley could be mounted on the hub portion of the second clutch member 12 as indicated in dotted lines at 29 and said clutch member would then be loosely engaged on its supporting shaft so that the clutch member carrying the pulley could remain idle while the shaft rotated within it.

What I claim is:

1. A clutch comprising a clutch member having relatively movable clamping parts, a second clutch member having a part disposed between the clamping parts of the first clutch member, a clamping screw having differential screw threads engaging the respective clamping parts of the first clutch member whereby to produce a differential clamping action of said parts on the interposed part of the second clutch member and means for rotating said clamping screw.

2. A clutch comprising a clutch member having relatively movable clamping parts, a second clutch member having a part disposed between the clamping parts of the first member, a plurality of clamping screws having differential screw threads engaging the respective clamping parts to thereby produce a differential movement of said clamping parts with respect to the interposed part of the second clutch member and means for rotating the differential clamping screws.

3. A clutch comprising a clutch member having relatively movable clamping parts, a second clutch member having a part disposed between the clamping parts of the first clutch member, a clamping screw having differential screw threads engaging the respective clamping parts to produce a differential movement of said clamping parts with respect to the interposed part of the second clutch member, said clamping screw having spiral ribs on the outer end portion thereof and means engaging said spiral ribs for rotating the clamping screw.

4. A clutch comprising a clutch member having relatively movable clamping elements, a second clutch member having a part entered between said clamping elements, a differential clamping bolt having a threaded portion of one pitch engaging one of the clamping elements and a second threaded portion progressing in the same direction but of a different pitch from the first threaded portion, engaging the other of the clamping elements and means for rotating said clamping bolt whereby to produce a differential movement of the clamping elements with respect to the interposed part of the second clutch member.

5. A clutch comprising a clutch member having relatively movable clamping elements, a second clutch member having a part entered between said clamping elements, a plurality of studs having screw threaded portions of one pitch engaging one of the clamping elements and screw threaded portions progressing in the same direction but of different pitch from the first threaded portions, engaging the second clamping element, and means for rotating said differential screw studs to thereby produce a differential movement of the clamping elements with respect to the interposed part of the second clutch member.

6. A clutch comprising a clutch member having relatively movable parts and a second clutch member engaged by one of said parts of the first clutch member, an operating screw having differential screw threaded portions engaged with the relatively movable parts of the first clutch member and means for rotating said operating screw.

7. A clutch comprising a clutch member having relatively movable clamping parts, a second clutch member adapted to be engaged by the clamping parts of the first clutch member, an operating screw having differential screw threads engaging the respective clamping parts of the first clutch member whereby to produce a differential clamping action of the clamping parts of the first clutch member with respect to the second clutch member and means for rotating the operating screw.

ELISHA H. COOPER.

Copies of this patent may be obtained for five cents each, by addressing the "Commissioner of Patents, Washington, D. C."